United States Patent [19]

Kramer et al.

[11] Patent Number: 5,414,852

[45] Date of Patent: May 9, 1995

[54] METHOD FOR PROTECTING DATA IN A COMPUTER SYSTEM

[75] Inventors: Paul H. Kramer; Kay A. Tate, both of Rochester, Minn.

[73] Assignee: International Business Machines Corporation, Armonk, N.Y.

[21] Appl. No.: 969,678

[22] Filed: Oct. 30, 1992

[51] Int. Cl.6 .............................................. G06F 12/14
[52] U.S. Cl. ............................ 395/700; 364/DIG. 2; 364/969; 364/969.2; 364/969.3; 364/969.4
[58] Field of Search ................. 364/969.4, 969, 969.2, 364/969.3, 246.6, 246.8, 246.9; 395/700, 246.6, 246.8, 246.9, 969, 969.2, 969.3, 969.4

[56] References Cited

U.S. PATENT DOCUMENTS

| | | | |
|---|---|---|---|
| 4,525,780 | 6/1985 | Bratt et al. | 364/200 |
| 4,652,990 | 3/1987 | Pailen et al. | 364/200 |
| 5,148,481 | 9/1992 | Abraham et al. | 380/46 |
| 5,249,230 | 9/1993 | Mihm, Jr. | 380/23 |
| 5,276,901 | 1/1994 | Howell et al. | 395/800 |

Primary Examiner—Kevin A. Kriess
Assistant Examiner—Jonathan Hall Backenstose
Attorney, Agent, or Firm—Steven W. Roth; Kenneth C. Hill; Andrew J. Dillon

[57] ABSTRACT

A data processing system include a plurality of data objects which are accessible by application programs through a system level interface. Each data object has an associated user access list. In addition, each object has at least one key indicating which applications can access that object. The key is preferably maintained in a protected storage area, accessible only by the low level system interface. Both the application identifier key and the user who invoked that application must match the identifier information in the data object for access to be allowed to that object. If an unauthorized user attempts access to the data object through the correct application, or an authorized user attempts access through an incorrect application, access to the data object will be denied by the low level interface.

14 Claims, 3 Drawing Sheets

METHOD FOR PROTECTING DATA IN A COMPUTER SYSTEM

BACKGROUND OF THE INVENTION

1. Field of the Invention

The present invention relates generally to data processing systems, and more specifically to a mechanism for protecting data in a data processing system.

2. Description of the Prior Art

Various schemes are known in the art for protecting data in data processing systems. Examples of known protection mechanisms include access lists for files and programs, and password protection for access to selected data. Numerous techniques are known for ensuring that only appropriate users have access to sensitive data.

Permission to perform only selected functions on data is also common. For example, users may be given access to selected files for only limited purposes. Users may be allowed to only read the particular data file, they may be allowed to read from a file and write (update) that file, or they may be authorized to read, write and delete that file. Access lists can be used to designate which users have some or all types of access to any particular file or groups of files.

In many systems, access to data is performed through a system level interface. This interface is a low level procedure which contains trusted code and can only be invoked by other procedures through well defined system calls or similar interfaces. This interface has the capacity for performing data accesses and manipulations which are denied to normal applications. For example, such an interface typically has the capability of keeping internal information which is hidden from calling applications.

In a typical system of this type, a user invokes an application, which in turn accesses data through the low level system interface. To provide security for sensitive data, the application must determine whether the user has authority to access the information. However, such a technique for limiting access suffers from a limitation in that other applications can access sensitive data, either accidentally or unknowing of restrictions which have been placed on access to that data. In order to try to ensure security of data, application programs must perform suitable checking to ensure that user access of data is appropriate. This can place significant burdens on the application programs, and still often fall short in adequate control of access to sensitive data.

It would be desirable to provide a system and method for providing improved data security in a data processing system.

SUMMARY OF THE INVENTION

Therefore, in accordance with the present invention, a data processing system includes a plurality of data objects which are accessible by application programs through a system level interface. Each data object has an associated user access list. In addition, each object has at least one key indicating which applications can access that object. The key is preferably maintained in a protected storage area, accessible only by the low level system interface. Both the application identifier key and the user who invoked that application must match the identifier information in the data object for access to be allowed to that object. If an unauthorized user attempts access to the data object through the correct application, or an authorized user attempts access through an incorrect application, access to the data object will be denied by the low level interface.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
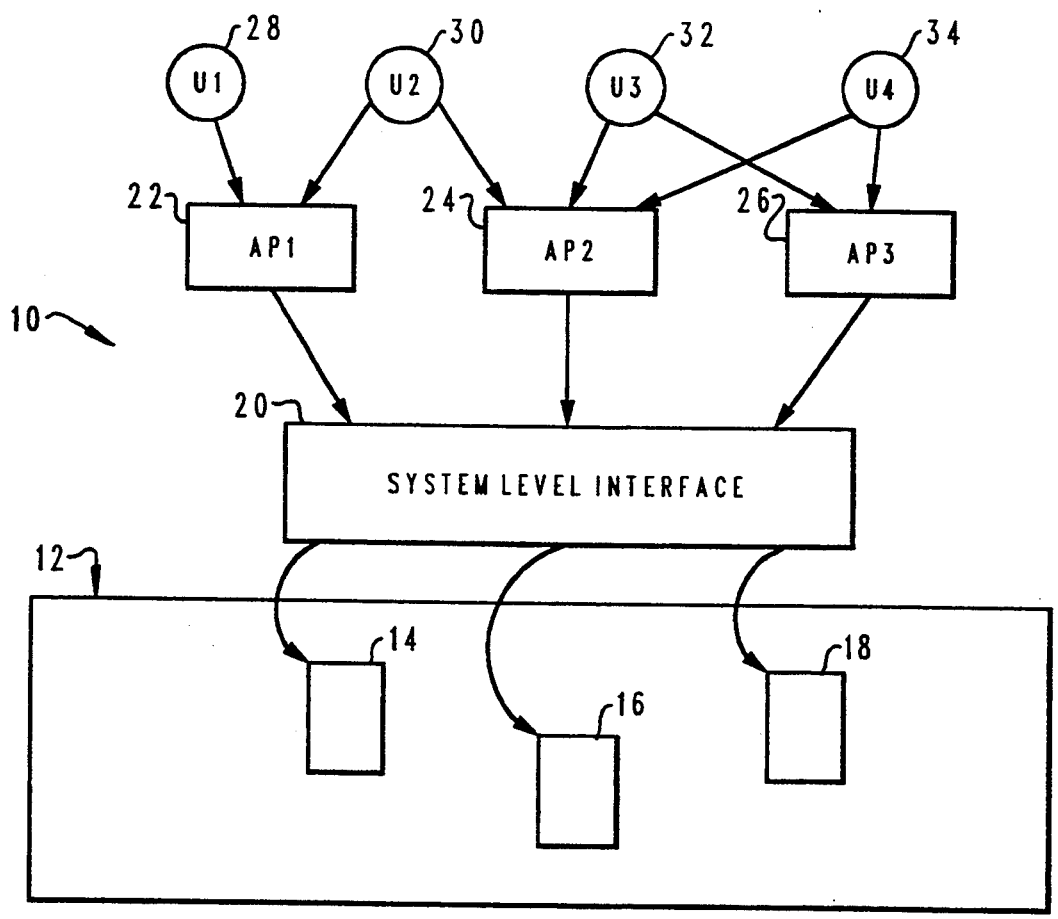
FIG. 1 is a block diagram illustrating a portion of a data processing system.

Referring to FIG. 1, a portion of a data processing system is generally referred to with reference number 10. A data processing system suitable for use with the present invention can be, for example, an AS/400 available from International Business Machines Corporation. Included within the data processing system 10 is a virtual storage space 12. As known in the art, such virtual storage space can include a main system memory backed by a high density backing store, such as a magnetic disk drive. The physical construction of the virtual storage 12 is not important to the present invention.

Contained within the virtual storage 12 are a large number of data objects. Three data objects 14, 16, 18, are illustrated in FIG. 1, but it will be appreciated by those skilled in the art that a much larger number of objects is typically present. Each data object 14–18 represents a block of data which is to be considered as a single entity for access control purposes. The precise nature of the data objects is not important to the present invention, and can be any type of object which is normally utilized by the data processing system 10. For example in an object oriented system, each of the data objects 14–18 an "object" in the normal sense of the object oriented system. Each data object 14–18 can also represent a table in a more traditional relational database system. Each object could be a complete table, or could correspond to multiple tables or only a portion of a single table. Other categorizations for such data objects will be apparent to those skilled in the art.

In the preferred embodiment, all access to data objects 14–18 is performed through a system level interface 20. System level interface 20 is typically a block of low level, trusted program code, and provides the only means of access to the data objects stored in virtual storage 12. This low level code typically operates in a supervisory, or similar, mode which is not allowed to application programs. As is well known, system interface 20 may be invoked to access the virtual storage 12 by means of system calls, software interrupts, and similar techniques.

Applications 22, 24, 26 execute within the data processing system 10, and access the data objects through the system level interface 20. Many types of applications which access data objects in the virtual storage 12 are represented by applications 23-26. For purposes of the following discussion, applications 22-26 will be referred to as "data managers". The term data manager is intended to refer to any application, procedure, or process which manages data within the virtual storage 12 through the intermediary of the system level interface 20.

Users 28, 30, 32, 34 can each invoke one or more of the data manager applications 22-26. As used in this description, the users 28-34 can represent an actual person sitting at a work station or other input/output device through which information can be communicated between the user and the applications 22-26. An application may be directly invoked by user and perform input/output directly with a user. The data manager applications may also be invoked indirectly by a user through any number of intermediate programs (not shown), which has the same effect as a direct invocation by a user for purposes of the present invention.

When a user invokes a data manager application, either directly or indirectly, a user identifier is contained within the process identifier of a process associated with such invocation. Thus, when a data manager application 22-26 is invoked the identity of the invoking user 28-34 is always available. In addition, when a data manager 22-26 makes a call to the system level interface 20 the identity of the calling data manager 22-26 is made available to the system level interface 20 as well. Thus, when access is made to a data object 14-18 by the system level interface, the interface 20 has available to it both an identifier associated with the particular data manager making the access, and an identifier for the user which originated the access through the data manager.

Figure 2:
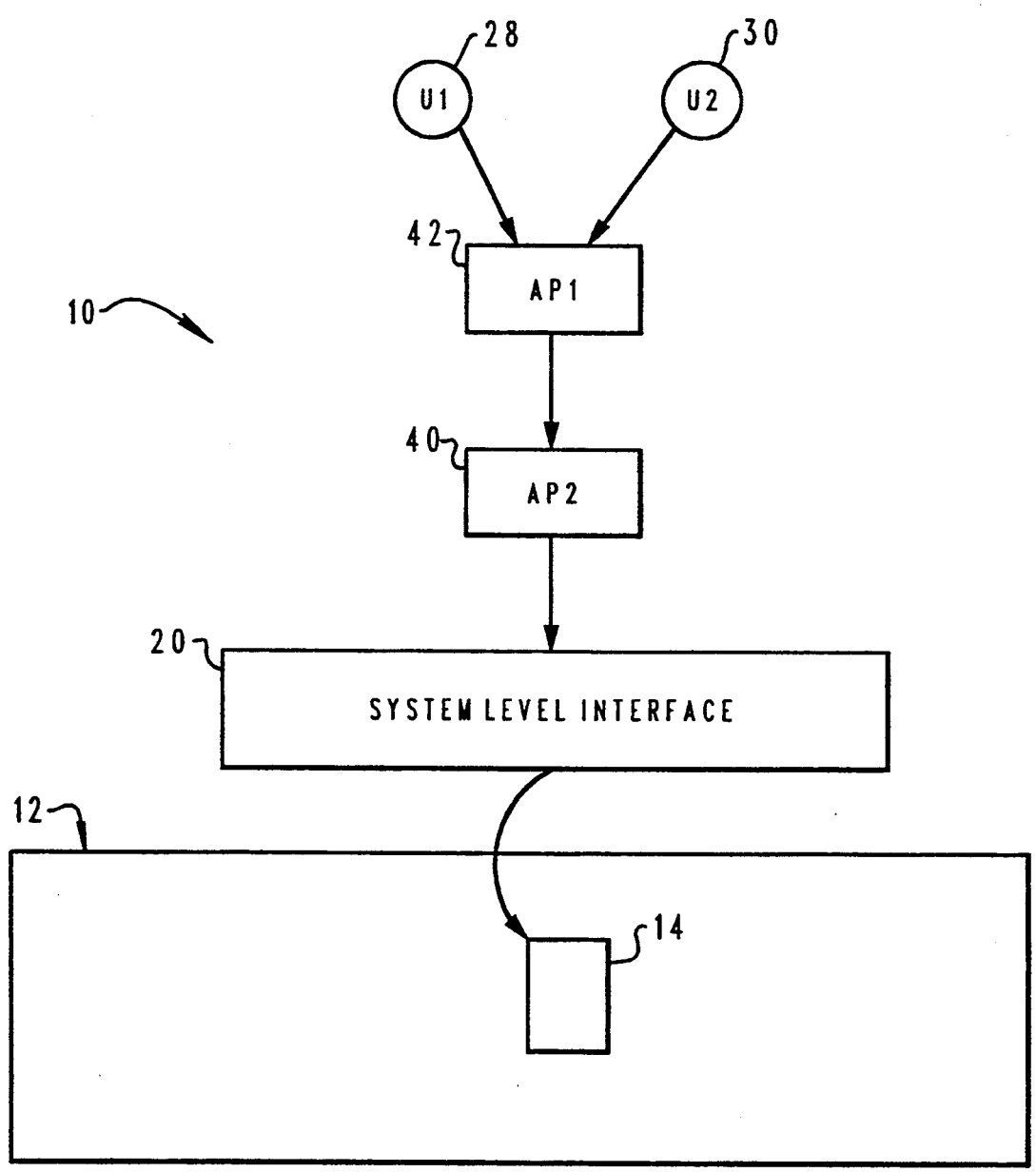
FIG. 2 is a block diagram illustrating a hierarchy of data manager applications for accessing a data object.

FIG. 2 illustrates a preferred embodiment of the present invention. Each data object is accessed by more than one data manager in a hierarchy, with a first data manager accessing a second data manager, which in turn accesses the data objects through the low level interface. In the example of FIG. 2, a data manager 40 is invoked by a user 28, 30 through an intervening data manager 42. This relationship could represent, for example, a data manager 40 which is a low level data base engine in an object oriented system, which is in turn invoked by data manager 42 which represents one of several interfaces to the data base engine which can be utilized by users. Data manager 42 can be, for example, a security manager whose primary function is to use the database for storing access information. Additional data managers can be provided in a chain, with a user requesting access at one end, and the low level system interface at the other.

In the example of FIG. 2, it is desirable to restrict access to data object 14 to authorized users who access the data object 14 through both data manager 40 and data manager 42. Thus, if authorized user 28 were to access data object 14 through a separate data manager (not shown) which in turn invoked data manager 40, access would be denied by the system level interface 20.

Figure 3:
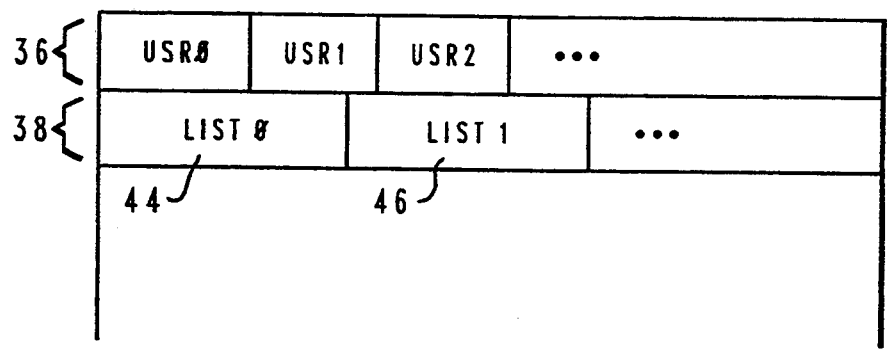
FIG. 3 illustrates identification information stored in a header of a data object.

Each of the data objects 14-18 has associated with it, in addition to information normally available in the system, two types of information relevant to access control. This information is typically contained in an object header, as shown in FIG. 3. An access list 36 within each object contains the user identifiers for all users which are authorized to access the associated data object. Preferably, using techniques known in the art, the access list includes access permission types for each user. Typical permission types which may be used include read, for which the user has only read access to the data object; write, for which the user has write (modify) access to the data object; and delete, for which the user has the authority to delete the data object. It is common for different users to have different permissions for different data objects. For example, in a shared database, a small number of users may have write and delete access, while a much larger number of users may have read only access to the objects within the database.

In addition to the access list 36, a key list 38 is also associated with each data object in the virtual storage 12. The key list 38 contains one or more lists of identifiers 44, 46, each identifying data managers which are authorized to access this particular object. In some lists 44, 46, only a single data manager will be required to provide access to a data object, with this data manager being the one which created that object. However, other lists will contain identifiers of two or more data managers, with the requirement that all of the identified data managers must be invoked in an invocation hierarchy in order to match the list.

In order for one of the lists 44, 46 to give a key list match, all of the identifiers in the list 44, 46 must match with a data manager in the hierarchy of calling data managers. If any data manager is missing, no match will be generated with a sublist which requires it. Thus, if list 44 contains identifiers for data managers 40 and 42, no match is generated unless both of them are called in an invocation hierarchy as illustrated in FIG. 2. It will be appreciated by those skilled in the art that various combinations of data managers can be required in order to allow access to any individual data object. For example, a single data object may be accessible through a single data manager, or only through an invocation hierarchy of 2, 3, or more data managers alternatively.

Because the system level interface 20 controls all access to the data objects, access to the access list and key list are controlled by the system level interface 20. In the preferred embodiment, the key list 38, having lists containing the identity of all data managers which have access to any particular object, is accessible only by the system level interface 20. The key list is stored in a portion of the object, or a separate memory associated with the object known as a protected storage area. If the data objects are objects within an object oriented system, the keys for the various data objects are referred to as encapsulated.

The access list, containing identifiers of the users authorized access to each particular data object, is normally made available to at least one of the data managers having access to that data object. This allows the data managers to modify the access list, adding and deleting users who have access, and changing the access permissions for users as desired.

Permission types can also be provided for each data manager having access to a data object. Read, write, and delete permissions are analogous to those available to users. In addition, a permission can be provided to determine whether a data manager is allowed to modify the user access list. Changes can be made to the user access list only by data managers which have such an access list update permission.

When access is requested of a particular data object, object 14 for example, through the system level interface 20, the system level interface 20 compares the identifier of the original invoking user and the calling data managers with those stored in the access list 36 and key list 38. A match must be found in both lists in order for access to be allowed by the system level interface 20. If the key list indicates that access is allowed through a hierarchy of data managers, all of the data managers in the hierarchy must be invoked in a chain in order to allow access.

If an authorized user accesses a particular data object through an unauthorized data manager, an authorized data manager accesses an object having been invoked by an unauthorized user, or one of the data managers in a hierarchical list has not been invoked in the chain, access to that particular data object is denied. If either or both of the access list 36 and key list 38 have various access permissions for the users and data managers, these permissions must also be satisfied before access will be allowed by the system level interface 20. For example, if data managers 40, 42 are allowed read, write, and delete access to object 14, but authorized user 28 is allowed only read access to data object 14, the system level interface 20 will not allow user 28 to modify data object 14 even through the invocation of data manager 22.

Figure 4:
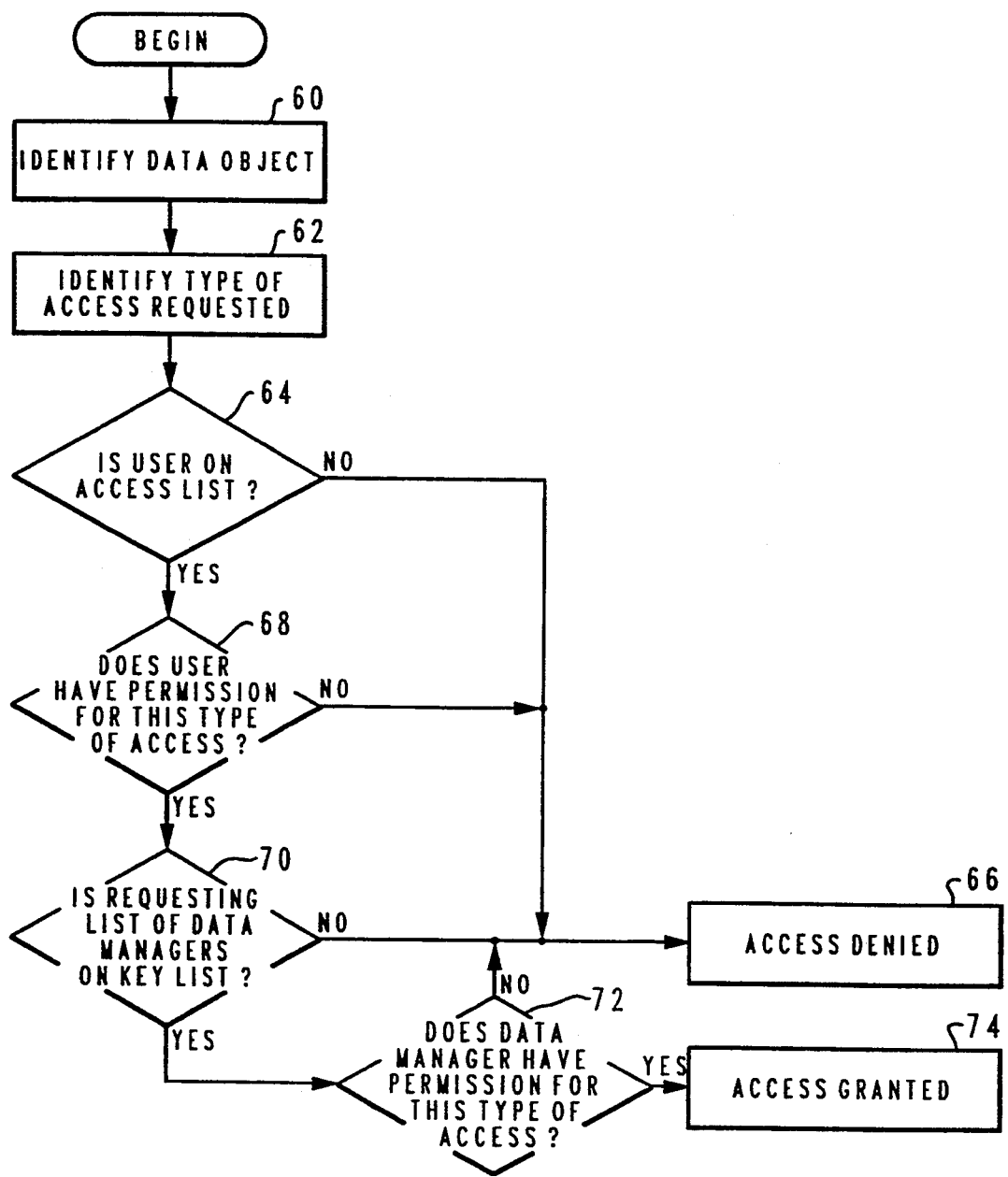
FIG. 4 is a flow chart illustrating operation of a preferred system level interface.

The decision making process performed by the system level interface 20 is shown in the flow chart of FIG. 4. When a call is made to the system level interface to access an object, the data object is identified 60 and the type of access which has been requested is identified 62. A check is made to determine whether the user responsible for the request is on the access list for that data object 64, and if not access to the data object is denied 66. If the user is on the access list, control is passed to block 68 in which a check is made to determine whether a user has permission for this type of access. If not, access is again denied 66. If the user does have permission for this type of access, a determination is made 70 whether all of the requesting list of data managers are in the key list for the object. If not, access is denied 66. If the data managers are on the key list, the system determines 72 whether they have permission for this type of access. If not, access is denied. Only if all possible elements are correctly matched is access granted 74.

Consistent with the above description, it will be apparent that not all of the tests 64, 68, 70, 72, need be performed. For example, data managers may not be provided with permission types, so the test of block 72 will not be included. If permissions are not used to control user access, decision block 68 will also not be included. Additionally, the actual determinations may be made in any order, or performed simultaneously.

Special default values can be used in either the access list or the key list to indicate that access is not restricted at all. For example, some data objects may need to be made available to all system users, and it may be burdensome to maintain large and constantly changing access lists to ensure that every system user has access to a data object. In this case, a special flag can be used in the access list to indicate that all users have access, which essentially causes decision block 64 to always indicate yes. If permissions are used, it is possible to provide a default user access symbol having restricted permissions, such as read only. In this case, the access list would have an individual list of users which need write and delete privileges, while the default symbol, which selects any other users, has only read permission. A similar technique can be used for the data managers, in a situation in which access is to be restricted only by user identifier, with any data manager having access to the object. This can be useful when retrofitting the new features into an existing system which previously only had user access lists to control access to the various data objects. In such case, all preexisting objects can be treated as having a default value allowing access by all data managers, while newly created objects can have a more specific key list. It will be apparent that the user list and key lists can be combined in various ways to better control access to individual data objects.

It will be appreciated by those skilled in the art that the described system provides for improved control over access to objects in a data processing memory. Both the condition of an authorized user, as indicated by an identifier contained within an access list 36, and authorized data managers, as indicated by identifiers in key list 38, are required to provide access to any given data object in the system. This is roughly analogous to the use of two separate keys required to open a safe deposit box. Possession of only a single key will not allow access to the contents of the box. In the same manner, access by an authorized user through an unauthorized data manager, or vice versa, will not allow access to the data object.

The system and method described above have several advantages over prior art techniques. All access control to data objects is performed by a single interface, so that this function need not be repeatedly performed by numerous application programs. The various data managers have the flexibility of changing the list of authorized users without affecting the underlying operating of the system level interface. As indicated previously, the implementation of this feature can be retrofit to existing systems which provide user identifier access controls without having previously provided access control based upon the identity of the accessing data manager.

While the invention has been particularly shown and described with reference to a preferred embodiment, it will be understood by those skilled in the art that various changes in form and detail may be made therein without departing from the spirit and scope of the invention.

What is claimed is:

1. In a data processing system, a computer-implemented method for controlling access to a plurality of data objects, comprising the steps of:
   when each of the plurality of objects is created, associating with such object at least one user identifier, and at least one list of data manager identifiers;
   invoking a first data manager using a user identifier to identify an invoking user;
   invoking a second data manager from the first data manager; and
   when the second data manager later attempts to access a data object, allowing such access only if one of the lists of data manager identifiers associated with the data object contains both the first and second data managers, and the first data manager has been invoked with a user identifier associated with the object.

2. The method of claim 1, wherein each data object is created by a data manager, and an identifier of the creating data manager is included in one of the lists of data managers associated with each created object.

3. The method of claim 2, wherein identifiers for at least three data managers are included in one of the lists associated with at least one selected data object.

4. The method of claim 2, wherein a list of user identifiers associated with a data object can be modified by the data manager which created the data object.

5. The method of claim 2, wherein data objects are created by data managers through a system level interface, and the data manager identifier associated with each data object is accessible only by the system level interface.

6. The method of claim 1, wherein each user identifier associated with each data object has a type of access permission, and access to that data object by a process utilizing any particular user identifier is allowed to perform only those actions defined by the access permission type.

7. The method of claim 6, wherein the access permission types include read for read only access, write for write access, and delete for delete access.

8. The method of claim 1, wherein each data manager associated with any particular data object has a type of access permission, and access to that data object by a process utilizing any particular data manager identifier is allowed to perform only those actions defined by the access permission type.

9. The method of claim 8, wherein the access permission types include read for read only access, write for write access, delete for delete access, and update for access to the associated user identifiers for modification thereof.

10. A computer-implemented method for controlling access to a plurality of data objects in a data processing system, comprising the steps of:

for each data object, providing a user list containing at least one user identifier, and a data manager list containing at least two data manager identifiers;

each time a data manager accesses a data object, comparing an identifier for such data manager with the data manager list for such object, and comparing a user identifier of a user which invoked the data manager with the user list for such object; and permitting access to the data object only if the user identifier is contained in the user identifier list, each of the data manager identifiers are contained in the data manager identifier list, and each of the data managers in the data manager list has been invoked in a chain to access the selected data object.

11. The method of claim 10, wherein each user identifier contained in the user identifier list of each data object has a type of access permission, and access to that data object by a data manager utilizing any particular user identifier is allowed to perform only those actions defined by the access permission type.

12. The method of claim 11, wherein the access permission types include read for read only access, write for write access, and delete for delete access.

13. The method of claim 10, wherein each data manager contained in the data manager identifier list of each data object has a type of access permission, and access to that data object by a data manager utilizing any particular data manager identifier is allowed to perform only those actions defined by the access permission type.

14. The method of claim 13, wherein, the access permission types include read for read only access, write for write access, delete for delete access, and update for access to the associated user identifiers for modification thereof.

* * * * *